US008489238B2

(12) United States Patent
Ooga et al.

(10) Patent No.: US 8,489,238 B2
(45) Date of Patent: Jul. 16, 2013

(54) ROBOT CONTROL APPARATUS

(71) Applicants: Junichiro Ooga, Kawasaki (JP); Junji Oaki, Kawasaki (JP); Hideki Ogawa, Tokyo (JP)

(72) Inventors: Junichiro Ooga, Kawasaki (JP); Junji Oaki, Kawasaki (JP); Hideki Ogawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/677,761

(22) Filed: Nov. 15, 2012

(65) Prior Publication Data

US 2013/0073084 A1 Mar. 21, 2013

Related U.S. Application Data

(63) Continuation of application No. PCT/JP2010/060543, filed on Jun. 22, 2010.

(51) Int. Cl.
*G05B 19/04* (2006.01)
*G05B 19/18* (2006.01)

(52) U.S. Cl.
USPC ........................................................ 700/254

(58) Field of Classification Search
USPC ........................................................ 700/254
See application file for complete search history.

(56) References Cited

U.S. PATENT DOCUMENTS

| | | | | |
|---|---|---|---|---|
| 4,975,856 A * | 12/1990 | Vold et al. | ...................... | 700/263 |
| 7,390,309 B2 * | 6/2008 | Dariush | ............................. | 601/5 |
| 2003/0135303 A1 * | 7/2003 | Arai et al. | ...................... | 700/245 |
| 2005/0113973 A1 * | 5/2005 | Endo et al. | ..................... | 700/245 |
| 2007/0013336 A1 * | 1/2007 | Nowlin et al. | ............ | 318/568.21 |
| 2007/0255454 A1 * | 11/2007 | Dariush | ........................ | 700/245 |
| 2011/0060460 A1 * | 3/2011 | Oga et al. | ...................... | 700/254 |
| 2012/0004775 A1 * | 1/2012 | Andoh | .......................... | 700/259 |

FOREIGN PATENT DOCUMENTS

| | | | |
|---|---|---|---|
| JP | 61-224012 | * | 10/1986 |
| JP | 08-141961 | | 6/1996 |
| JP | 09-248322 | | 9/1997 |
| JP | 9-248322 | * | 9/1997 |
| JP | 2002-283276 | * | 10/2002 |
| JP | 2003-025272 | | 1/2003 |

OTHER PUBLICATIONS

International Search Report for International Application No. PCT/JP2010/060543 mailed on Aug. 24, 2010.

* cited by examiner

*Primary Examiner* — Khoi Tran
*Assistant Examiner* — Harry Oh
(74) *Attorney, Agent, or Firm* — Turocy & Watson, LLP (57) ABSTRACT

A robot control apparatus according to an embodiment includes: a joint angle difference calculator calculating a joint angle difference; a torque command value calculator calculating a torque command value for a joint, based on the joint angle difference; an external torque calculator calculating an external torque that is a difference between the estimated drive torque and the torque command value, and determining an external force receiving joint shaft on which an external force from the external torque acts; a compliance model storage unit storing a compliance model at the external force receiving joint shaft; a compliance correction amount calculator calculating a compliance correction amount for a task coordinate system position at the external force receiving joint shaft in accordance with the external force; and a joint angle difference correction amount calculator calculating a joint angle difference correction amount from the compliance correction amount and the partial Jacobian matrix.

4 Claims, 7 Drawing Sheets

ROBOT CONTROL APPARATUS

CROSS-REFERENCE TO RELATED APPLICATION

This application is a Continuation application of and claims the benefit of International Application No. PCT/JP 2010/060543 filed on Jun. 22, 2010, the entire contents of which are incorporated herein by reference.

FIELD

Embodiments described herein relate generally to a robot control apparatus that drives a robot with an actuator such as a motor.

BACKGROUND

While a robot passes through operating points designated by an operator, an operation to reproduce and perform an operation desired by the operator is taught to the robot, so that the robot can perform a complicated operation such as an assembly operation. When an operator teaches an operation to a robot, the following methods can be used: indirect teaching in which an operation panel is used to designate positions of the respective joints of the robot, the tip of the robot, and tools, and postures of the robot; and direct teaching in which the operator operates a pointing device including a joystick or the like with the same degree of freedom as that of the tip of the robot, or a handle attached to the tip portion.

The direct teaching using a handle has the advantage that the operator can perform the teaching intuitively, and the time required for the teaching can be shortened accordingly. The direct teaching can be performed in the following manner: the servo of a joint of the robot is put into a free state, and a position and posture are designated; or only the torque required for maintaining a posture of the robot in a rest time is applied to the joints (gravity compensation). However, when an operator moves a joint, the operator needs to apply an external force large enough to overcome the friction force originating from the velocity reducer at the joint. Therefore, the manipulability is not very high. In view of this, a force sensor can be provided at the handle attaching portion, so as to construct a force control system to which operating forces applied from the operator are input. In some cases, another force sensor is provided to detect collisions between tools such as a hand and the object.

However, force sensors are costly, and are fragile against impact. Therefore, the use of force sensors is often avoided. Also, a force sensor is often attached to a portion near a tip portion of a robot. Such a force sensor cannot detect an external force applied to a link portion.

As a method of detecting a collision at a tip portion of a robot without an additional sensor, there is a known method by which the drive torque necessary for a joint is calculated from a joint position command or the like, the calculated necessary drive torque is compared with the drive torque determined from the current of the motor that drives each joint, and a collision at the tip portion of the robot is detected.

As described above, by a conventional technique, a collision at a tip portion of a robot can be detected. In the case of direct teaching, teaching needs to be performed through operations only on a tip portion but also on respective link portions. However, a collision at a link portion, or an external force applied to a link portion, cannot be detected by any conventional technique. Therefore, direct teaching to link portions cannot be performed.

DETAILED DESCRIPTION

A robot control apparatus that controls a robot comprising a joint shaft and a drive shaft transmitting a drive force to the joint shaft, according to an embodiment includes: an actuator driving the joint shaft in each control cycle; a drive shaft angle detector detecting an angle of the drive shaft; a joint shaft angle calculator calculating an angle of the joint shaft from the angle of the drive shaft; a tip position calculator calculating a position of a tip of the robot from the angle of the joint shaft; a position error calculator calculating a position error between the position, of the tip of the robot and a position command value for the position of the tip of the robot; a Jacobian matrix calculator calculating, based on the angle of the joint shaft, a partial Jacobian matrix of a portion between a task coordinate system and a joint coordinate system at the joint shaft, and calculating a Jacobian matrix of a portion between a task coordinate system and a joint coordinate system at the position of the tip of the robot by integrating the partial Jacobian matrix; a joint angle difference calculator calculating a joint angle difference; a torque command value calculator calculating a torque command value for a joint, based on the joint angle difference; a driver driving the actuator, based on the torque command value; a drive torque estimating unit estimating a drive torque for driving the actuator from the angle of the joint shaft; an external torque calculator calculating an external torque that is a difference between the estimated drive torque and the torque command value, and determining an external force receiving joint shaft on which an external force from the external torque acts; an external force calculator calculating, from the external torque and the partial Jacobian matrix, the external force acting on the external force receiving joint shaft; a compliance model storage unit storing a compliance model at the external force receiving joint shaft; a compliance correction amount calculator calculating a compliance correction amount for a task coordinate system position at the external force receiving joint shaft in accordance with the external force, using the compliance model; and a joint angle difference correction amount calculator calculating a joint angle difference correction amount from the compliance correction amount and the partial Jacobian matrix. The joint angle difference calculator calculates an uncorrected joint angle difference through an inverse kinematic calculation using the position error and the Jacobian matrix, and outputs the sum of the uncorrected joint angle difference and the joint angle difference correction amount as the joint angle difference.

The following is, a: description of an embodiment, with reference to the accompanying drawings. In the drawings, like components are denoted by like reference numerals. However, the drawings are merely schematic, and specific sizes should be determined in conjunction with the following description. Also, it should be understood that the relative sizes and proportions vary among the drawings.

The embodiment described below is merely an example of an apparatus and method for embodying the technical idea of the invention, and does not restrict materials, shapes, structures, layouts, and the like of components to those described below. Various changes may be made to the technical idea of the invention within the scope of the claims.

Figure 1:
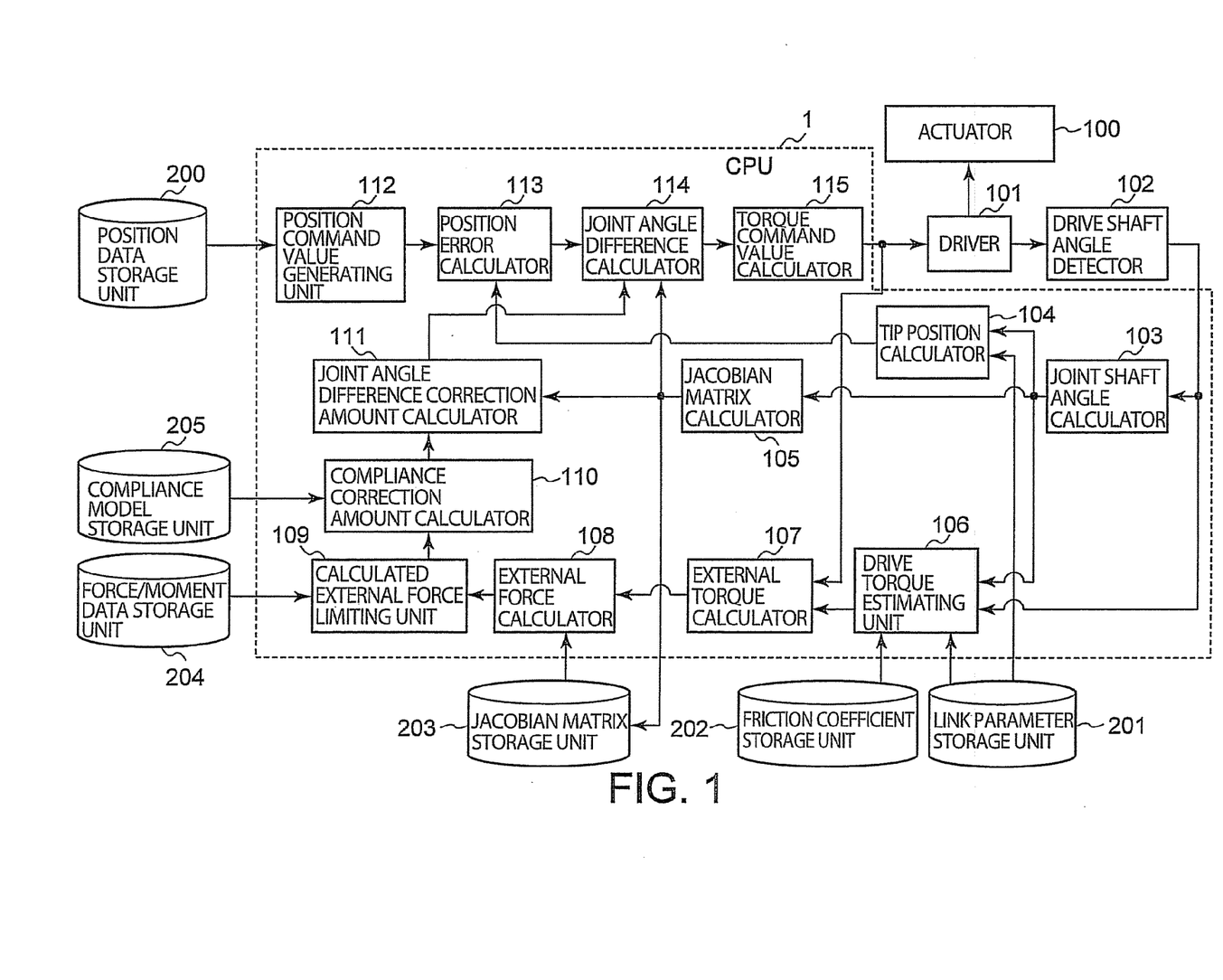
FIG. 1 is a block diagram of a robot control apparatus according to an embodiment.

As shown in FIG. 1, a robot control apparatus according to an embodiment includes a central processing unit (CPU) 1, an actuator 100, a driver (an amplifier) 101, a drive shaft angle detector 102, a position data storage unit 200, a link parameter storage unit 201, a friction coefficient storage unit 202, a Jacobian matrix storage unit 203, a force/moment data storage unit 204, and a compliance model storage unit 205.

Figure 2:
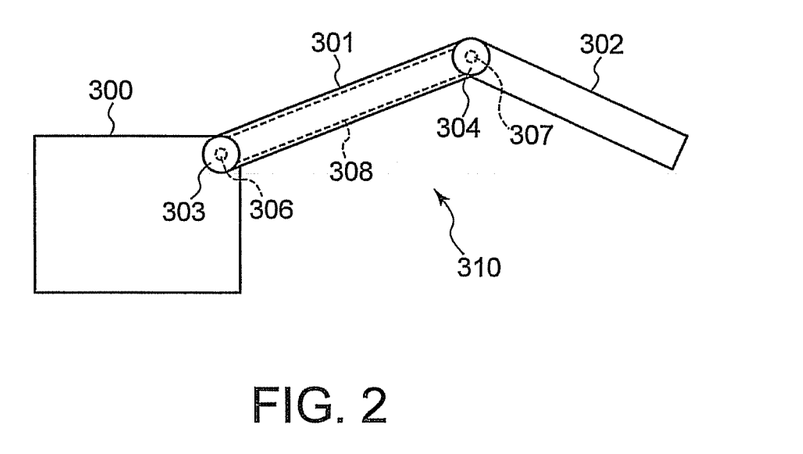
FIG. 2 is a schematic view of an example of a robot as an object to be controlled.

As schematically shown in FIG. 2, a robot as an example of the object to be controlled in this embodiment includes a main frame 300 and a movable unit 310 attached to the main frame 300. The movable unit 310 includes links 301 and 302, joints 306 and 307 formed with a driving pulley 303 and a following pulley 304, and a transmission mechanism (such as a belt) 308 wound around the driving pulley 303 and the following pulley 304.

Figure 3:
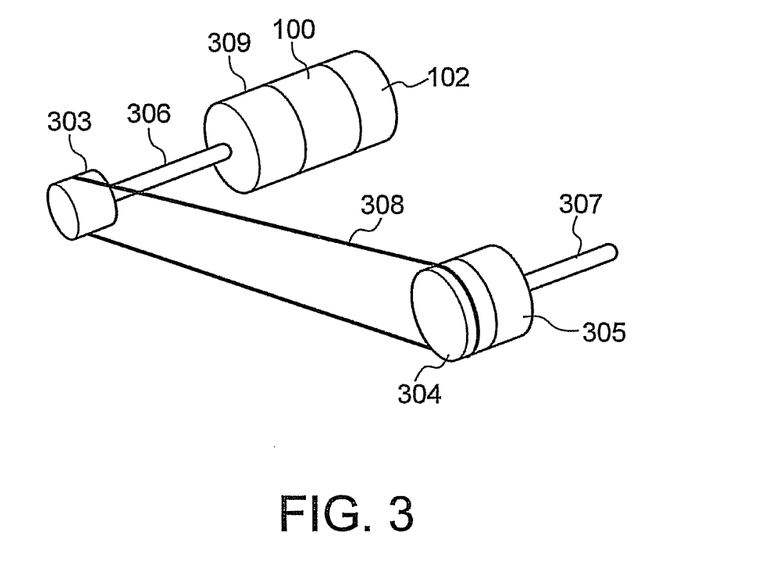
FIG. 3 is a schematic view of the movable unit of the robot shown in FIG. 2.

As schematically shown in FIG. 3, the driving pulley 303, a velocity reducer 309, the actuator 100, and the drive shaft angle detector 102 are attached to the drive shaft (a joint) 306. The actuator 100 rotates in each control cycle, and the velocity reducer 309 reduces the number of rotations and increases the torque. On the other hand, the following pulley 304 and the joint shaft angle detector 305 are attached to the joint shaft (a joint) 307. The joint shaft 307 is rotatively driven by the rotation of the drive shaft 306 via the driving pulley 303, the transmission mechanism 308, and the following pulley 304. In the robot control device of this embodiment described herein, control is to be performed on the drive shaft 306 and the joint shaft 307, for ease of explanation.

Position sensors such as encoders can be used as the drive shaft angle detector 102 and the joint shaft angle detector 305, and the drive shaft angle detector 102 and the joint shaft angle detector 305 may each include a filter that removes predetermined frequency components. The drive shaft angle detector 102 detects a displacement amount of the position of the drive shaft 306 (a drive shaft angle). The joint shaft angle detector 305 detects a displacement amount of the position of the joint shaft 307 (a joint shaft angle). The joint shaft angle may not be detected by the joint shaft angle detector 305, but may be calculated by using the drive shaft angle, the reduction ratio of the velocity reducer 309, and the transmission ratio of the transmission mechanism 308.

The CPU 1 shown in FIG. 1 logically includes, as modules (logic circuits) that are hardware resources, a joint shaft angle calculator 103, a tip position calculator 104, a Jacobian matrix calculator 105, a drive torque estimating unit 106, an external torque calculator 107, an external force calculator 108, a calculated external force limiting unit 109, a compliance correction amount calculator 110, a joint angle difference correction amount calculator 111, a position command value generating unit 112, a position error calculator 113, a joint angle difference calculator 114, and a torque command value calculator 115.

Based on the drive shaft angle calculated by the drive shaft angle detector 102, the joint shaft angle calculator 103 calculates a joint shaft angle in accordance with the reduction ratio of the velocity reducer 309, and the ratio between the drive shaft 306 and the joint shaft 307 in the transmission mechanism 308. Alternatively, a joint shaft angle can be determined directly by the joint shaft angle detector 305 attached to the joint shaft 307.

The tip position calculator 104 reads link parameters from the link parameter storage unit 201, and calculates the position of the tip of the robot in the task coordinate system through a forward kinematic calculation, using the joint shaft angle calculated by the joint shaft angle calculator 103 and the read link parameters.

The Jacobian matrix calculator 105 calculates a Jacobian matrix from the joint shaft angle calculated by the joint shaft angle calculator 103, and stores the calculated Jacobian matrix into the Jacobian matrix storage unit 203. A Jacobian matrix is a matrix representing the minute displacement relation between the task coordinate system and the joint coordinate system of the robot. Where J represents the Jacobian matrix, the error $\Delta x$ in the position of the tip of the robot and the joint angle difference $\Delta \theta$ satisfy the relation expressed by the following equation (1).

$$\Delta x = J \Delta \theta \quad (1)$$

Figure 4:
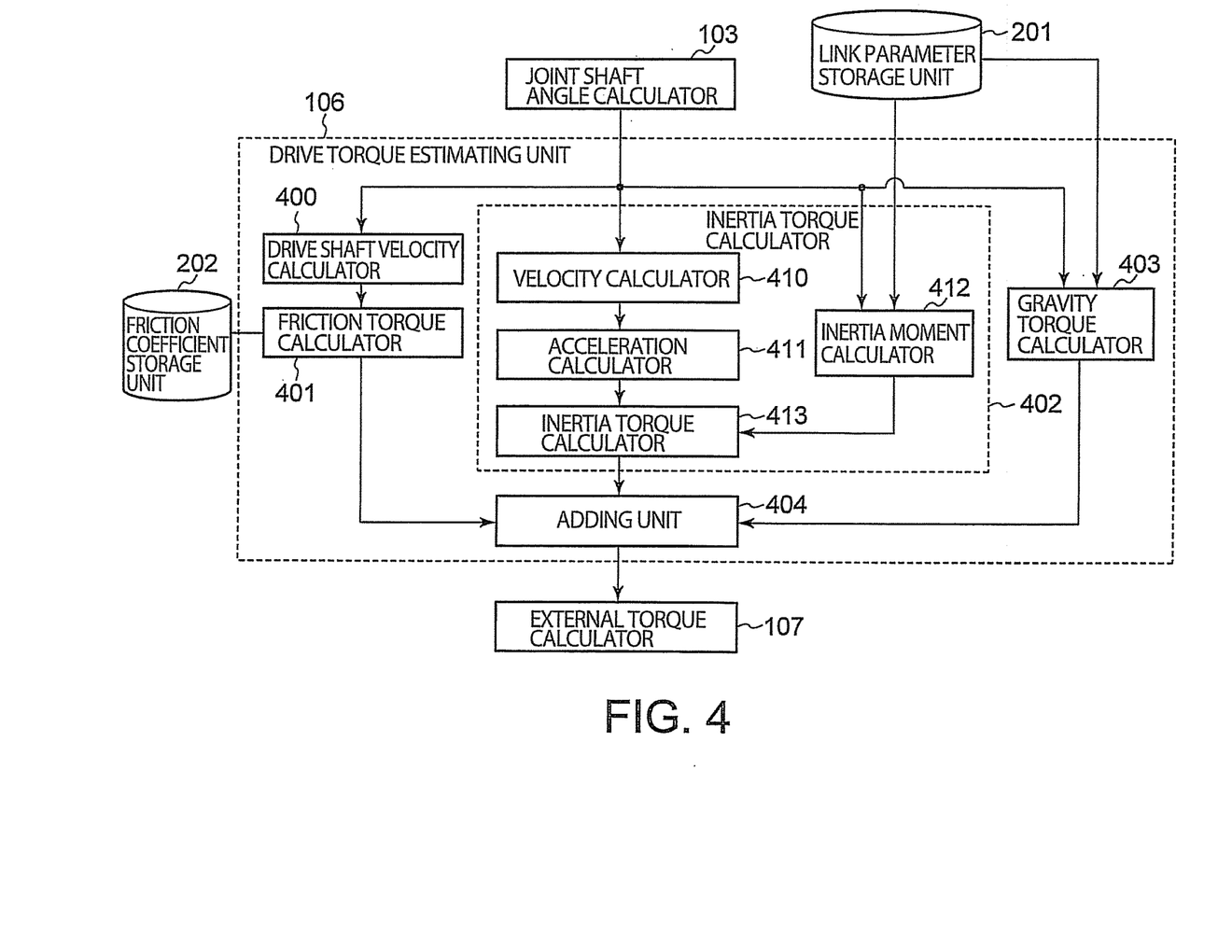
FIG. 4 is a block diagram of the drive torque estimating unit according to the embodiment.

Using the drive shaft angle detected by the drive shaft angle detector 102 and the joint shaft angle calculated by the joint shaft angle calculator 103, the drive torque estimating unit 106 estimates the drive torque necessary for driving the joint shaft 307 of the robot. FIG. 4 shows a specific example of the drive torque estimating unit 106. As shown in FIG. 4, the drive torque estimating unit 106 of this specific example includes a drive shaft velocity calculator 400, a friction torque calculator 401, an inertia torque calculator 402, a gravity torque calculator 403, and an adding unit 404.

The drive shaft velocity calculator 400 calculates a drive shaft velocity by determining a temporal difference in the joint shaft angle, for example, based on the joint shaft angle calculated by the joint shaft angle calculator 103. The friction torque calculator 401 reads a friction coefficient stored in the friction coefficient storage unit 202, and calculates a friction torque corresponding to a coulomb friction, a viscous friction, or the like, using the drive shaft velocity calculated by the drive shaft velocity calculator 400 and the read friction coefficient.

The inertia torque calculator 402 includes a velocity calculator 410, an acceleration calculator 411, an inertia moment calculator 412, and an inertia torque calculator 413. The velocity calculator 410 calculates a joint angular velocity, using, the joint shaft angle calculated by the joint shaft angle calculator 103. The acceleration calculator 411 calculates a joint angular acceleration, based on the joint angular velocity calculated by the velocity calculator 410. The inertia moment calculator 412 reads the link parameters from the link parameter storage unit 201, and calculates the inertia moment of each of the links 301 and 302, using the link parameters and the joint shaft angle calculated by the joint shaft angle calculator 103. The inertia torque calculator 413 then calculates an inertia torque, using the joint angular acceleration calculated by the acceleration calculator 411 and the inertia moment calculated by the inertia moment calculator 412.

The gravity torque calculator 403 reads the link parameters from the link parameter storage unit 201, and calculates the gravity force acting on each of the links 301 and 302, using the read link parameters and the joint shaft angle calculated by the joint shaft angle calculator 103. The gravity torque calculator 403 then calculates the gravity torque to compensate for the calculated gravity force.

The adding unit 404 calculates the sum of the friction torque calculated by the friction torque calculator 401, the inertia torque calculated by the inertia torque calculator 413, and the gravity torque calculated by the gravity torque calculator 403. The adding unit 404 then outputs the sum as an estimated drive torque.

The external torque calculator 107 shown in FIG. 1 calculates, as an external torque, the difference between the drive torque estimated by the drive torque estimating unit 106 and a torque command value calculated by the torque command value calculator 115.

The external force calculator 108 calculates an external force, using the external torque calculated by the external torque calculator 107 and the Jacobian matrix calculated by the Jacobian matrix calculator 105. Based on the principle of virtual work, the external force $f_d$ is calculated by multiplying the external torque $\tau_d$ by the inverse matrix of the transposed matrix $J^T$ of the Jacobian matrix J, as expressed by the following equation (2).

$$f_d = (J^T)^{-1} \tau_d \quad (2)$$

In a case where an external force acts not on the tip portion of the robot but on a link portion, the external torque at the drive shaft close to the tip portion is zero. Therefore, a partial vector $\tau_{di}$ that does not become zero at each element of the external torque vector $\tau_d$ is expressed by the following equation (3).

$$\tau_{di} = (\tau_{di1}, \ldots, \tau_{dii}) \quad (3)$$

That is, the external force acting on the ith joint shaft counted from the base is not zero, but the external force acting on the portion extending from the (i+1)th joint shaft to the tip portion is zero. In that case, the external force acting on the ith joint shaft can be determined by multiplying the external torque by the inverse matrix of the transposed matrix $J_i^T$ of the partial Jacobian matrix $J_i$ of the portion extending to the ith joint shaft. The partial Jacobian matrix $J_i$ of the portion extending from the base to the ith joint shaft is part of the Jacobian matrix J, and is determined by using the following equation (4).

$$J_1 = \begin{pmatrix} z_i \times (p_i - p_1), \ldots, z_i \times (p_i - p_i) \\ z_1, \ldots, z_i \end{pmatrix} \quad (4)$$

where, $z_i$ represents the joint shaft rotational direction vector of the joint coordinate system of the ith joint shaft, and $p_i$ represents the position vector of the origin of the joint coordinate system of the ith joint shaft seen from the base coordinate system. In the equation (4), each symbol "x" represents a vector cross product. Where the ith joint shaft is called an external force receiving joint, the external force $f_{di}$ acting on the external force receiving joint can be calculated by the external force calculator 108 using the following equation (5).

$$f_{di} = (J_i^T)^{-1} \tau_{di} \quad (5)$$

The calculated external force limiting unit 109 reads allowable force and allowable moment data (an allowable value) stored in the force/moment data storage unit 204. If the calculated external force exceeds the allowable value, a saturation process is performed. That is, the allowable value is output as the calculated external force. If the calculated external force is smaller than a predetermined minimum value, the calculated external force is output as zero (a dead-zone process). If the calculated external force is not smaller than the minimum value and not larger than the allowable value, the calculated external force is output as it is.

The compliance correction amount calculator 111 reads a compliance model from the compliance model storage unit 205, and calculates a position correction amount corresponding to the output of the calculated external force limiting unit 109, using the read compliance model. Here, the compliance model virtually defines an inertia, a viscosity, and a rigidity with respect to the object of contact, as expressed by the following equation (6), for example.

$$M d^2 \Delta x/dt^2 + D d\Delta x/dt + K\Delta x = K_f \Delta f \quad (6)$$

where $\Delta x$ represents an error in the task coordinate system set at the external force receiving joint, $d\Delta x/dt$ represents a velocity in the task coordinate system, $d^2\Delta x/dt^2$ represents an acceleration vector in the task coordinate system, M represents an inertia matrix, D represents a viscosity coefficient matrix, K represents a rigidity coefficient matrix, and $K_f$ represents a force feedback gain matrix. The force feedback gain matrix $K_f$ includes a compliance select matrix that switches one shaft to another, on which a force is to act and of which position is to be affected. The error velocity $d\Delta x/dt$ and the acceleration vector $d^2\Delta x/dt^2$ can be approximated by a single difference and a two-time difference in the position error vector $\Delta x$ with respect to time, respectively. Accordingly, the compliance correction amount $\Delta x_{comp}$ at the external force receiving joint can be calculated according to the following equation (7).

$$\Delta x_{comp} = 1/K(K_f \Delta f - Md^2\Delta x/dt^2 - Dd\Delta x/dt) \quad (7)$$

Using the compliance correction amount $\Delta x_{comp}$ and the inverse matrix of the partial Jacobian matrix $J_i$, the joint angle difference correction amount calculator 111 calculates the joint angle difference correction amount for the portion extending to the external force receiving joint according to the following equation (8).

$$\Delta \theta_{comp} = J_i^{-1} \Delta x_{comp} \quad (8)$$

The position command value generating unit 112 reads target tip position data stored in the position data storage unit 200, and calculates an interpolated tip position command value in each control cycle from the target tip position data.

Based on the tip position command value $x_R$ generated by the position command value generating unit 112 and the current tip position x calculated by the tip position calculator 104, the position error calculator 113 calculates a position error $\Delta x$, using the following equation (9).

$$\Delta x = x_R - x \quad (9)$$

The joint angle difference calculator 114 adds the joint angle difference correction amount $\Delta \theta_{comp}$ to the joint angle difference, which is caused by the error $\Delta x$ and is calculated by using the error $\Delta x$ calculated by the position error calculator 113 and the inverse matrix $J^{-1}$ of the Jacobian matrix J. That is, the joint angle difference calculator 114 performs a calculation according to the following equation (10).

$$\Delta \theta = J^{-1} \Delta x + \theta_{comp} \quad (10)$$

The torque command value calculator 115 generates a torque command value (a control target value) by integrating the joint angle difference calculated by the joint angle difference calculator 114. In accordance with the torque command value calculated by the torque command value calculator 115, the driver 101 drives the actuator 100 in each control cycle.

Semiconductor memories, magnetic disks, optical disks, magnetooptical disks, magnetic tapes, or the like can be used as the position data storage unit 200, the link parameter storage unit 201, the friction coefficient storage unit 202, the Jacobian matrix storage unit 203, the force/moment data storage unit 204, and the compliance model storage unit 205.

The position data storage unit 200 stores the target tip position data string to be used by the position command value generating unit 112 to generate the tip position command value. The link parameter storage unit 201 stores the link parameters related to the links 301 and 302 of the robot. The friction coefficient storage unit 202 stores friction coefficient data that are determined beforehand from the velocity-torque relationship in a constant velocity operation and are to be used by the friction torque calculator 401 to calculate the friction torque. The Jacobian matrix storage unit 203 stores the Jacobian matrix calculated by the Jacobian matrix calculator 105. The force/moment data storage unit 204 stores the target tip force data string to be used by the calculated external force limiting unit 109 to generate a tip position force command value. The compliance model storage unit 205 stores a predetermined compliance model.

(Robot Control Method)

Figure 5:
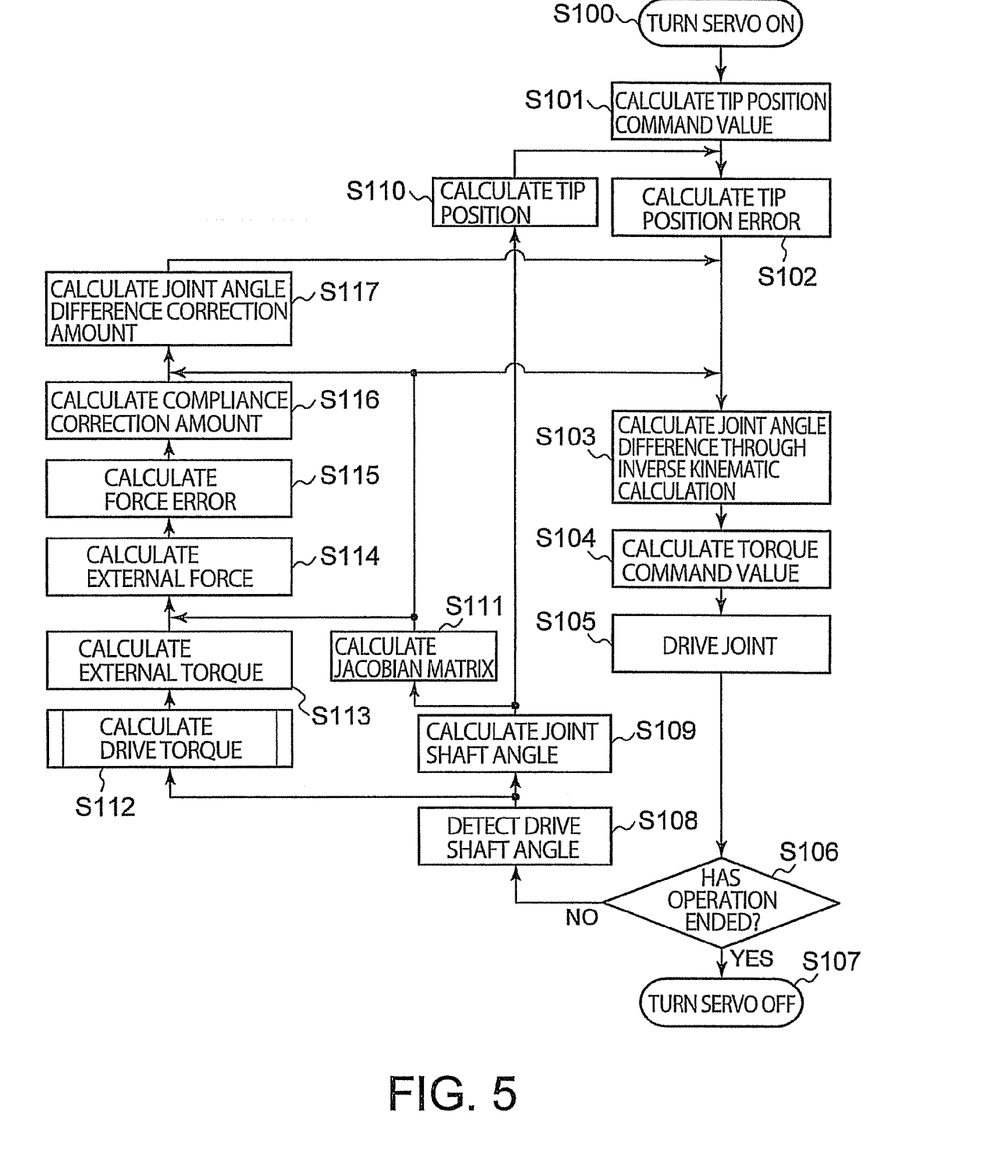
FIG. 5 is a flowchart showing operations of the robot control apparatus according to the embodiment.

Referring now to the flowchart shown in FIG. 5, operations of the robot control apparatus according to this embodiment are described.

a) First, a control operation is started. The position command value generating unit 112 reads the target tip position data string from the position data storage unit 200, and, based on the target tip position: data string, the position: command value generating unit 112 generates the tip position command value in each control cycle (steps S100 and S101). In step S102, the position error calculator 113 calculates the error between the tip position command value generated by the position command value generating unit 112 and the tip position calculated by the tip position calculator 104. In step S103, with the later described joint angle difference correction amount being taken into account, the joint angle difference calculator 114 calculates the joint angle difference by performing an inverse kinematic calculation on the error calculated by the position error calculator 113, as expressed by the equation (10) using the Jacobian matrix read from the Jacobian matrix storage unit 203.

After that, in step S104, the torque command value calculator 115 calculates the torque command value by integrating the joint angle difference calculated by the joint angle difference calculator 114. In step S105, the driver 101 drives the actuator 100, using the control target value that is the torque command value calculated by the torque command value calculator 115. In this manner, the drive shaft 306 is driven, and the tip position is controlled. In step S106, a check is made to determine whether the control operation has come to an end. In step S107, the servo process is ended. If an end of the control operation is not confirmed in step S106, the operation moves on to step S108.

b) In step S108, the drive shaft angle detector 102 detects the drive shaft angle. In step S109, from the drive shaft angle calculated by the drive shaft angle detector 102, the joint shaft angle calculator 103 calculates the joint shaft angle, based on the velocity reduction ratio of the velocity reducer or the like. In step S110, the tip position calculator 104 reads the link parameters from the link parameter storage unit 201. Using the read link parameters and the joint shaft angle calculated by the joint shaft angle calculator 103, the tip position calculator 104 calculates the tip position through a forward kinematic calculation. In step S111, using the joint shaft angle calculated by the joint shaft angle calculator 103, the Jacobian matrix calculator 105 calculates the Jacobian matrix.

c) In step S112, using the drive shaft angle calculated by the drive shaft angle detector 102 and the joint shaft angle calculated by the joint shaft angle calculator 103, the drive torque estimating unit 106 estimates the drive torque. In step S113, the external torque calculator 107 calculates the external torque from the difference between the drive torque estimated by the drive torque estimating unit 106 and the actual torque command value calculated by the torque command value calculator 115. In step S114, using the external torque calculated by the external torque calculator 107 and the partial Jacobian matrix calculated by the Jacobian matrix calculator 105, the external force calculator 108 calculates the external force expressed by the equation (5).

d) In step S115, the calculated external force limiting unit 109 reads an allowable force/moment data string from the force/moment data storage unit 204, and compares the read allowable force/moment data string with the external force calculated by the external force calculator 108. Based on the comparison result, a limited external force is output. That is, a saturation process or a dead-zone process is performed by the calculated external force limiting unit 109.

e) In step S116, the compliance correction amount calculator 110 reads the compliance model from the compliance model storage unit 205. Using the compliance model, the compliance correction amount calculator 110 calculates the correction amount at the external force receiving joint in accordance with the external force limited by the calculated external force limiting unit 109, as expressed by the equation (7). In step S117, using the compliance correction amount and the partial Jacobian matrix, the joint angle difference correction amount calculator 111 calculates the joint angle difference correction amount, as expressed by the equation (8). The operation then returns to step S103, and the position error calculator 113 calculates the joint angle difference by multiplying the inverse matrix of the Jacobian matrix by the error between the tip position command value generated by the position command value generating unit 112 and the tip position, calculated, by the tip position calculator 104, with the corrections amount calculated by the joint angle difference correction amount calculator 111 being taken into account, as expressed by the equation (9).

(Drive Torque Estimating Operation)

Figure 6:
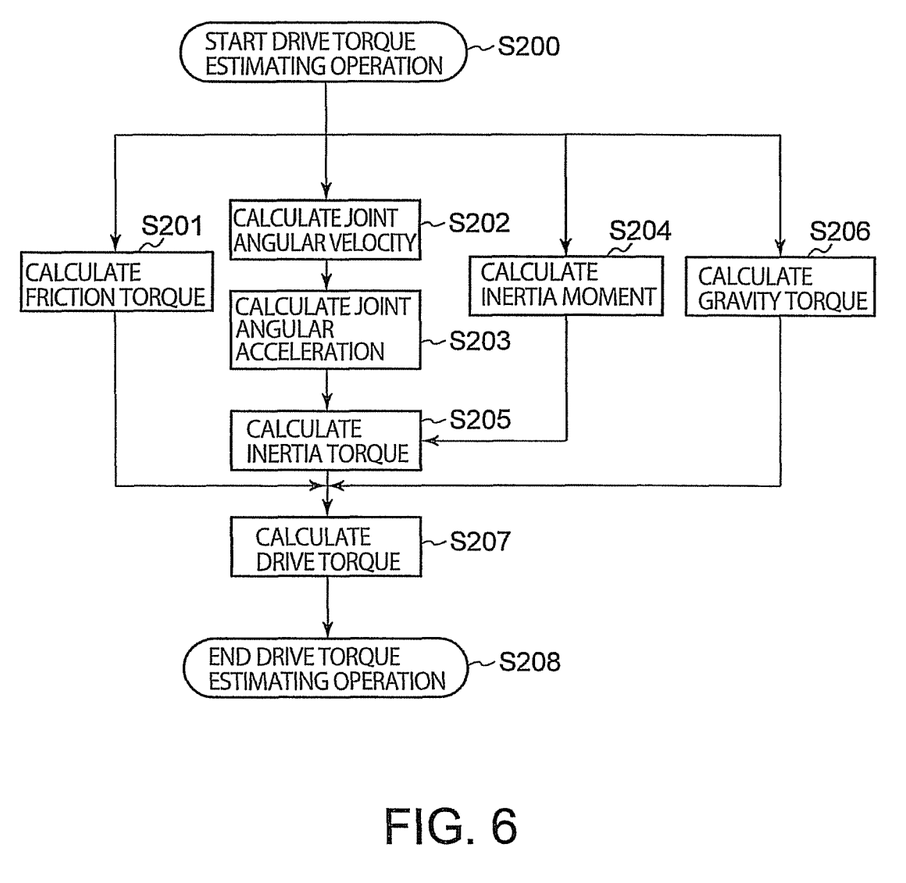
FIG. 6 is a flowchart showing an example of a drive torque estimating operation according to the embodiment.

Referring now to the flowchart shown in FIG. 6, the drive torque estimating operation of step S112 shown in FIG. 5 is described.

a) In step S200, the drive torque estimating operation is started. In step S201, the drive shaft velocity calculator 400 calculates the drive shaft velocity by determining the temporal difference in the drive shaft angle detected by the drive shaft angle detector 102. Further, the friction torque calculator 401 reads a friction coefficient from the friction coefficient storage unit 202. Using the read friction coefficient and the drive shaft velocity calculated by the drive shaft velocity calculator 400, the friction torque calculator 401 calculates the friction torque.

b) In step S202, the velocity calculator 401 calculates the joint shaft velocity by determining the temporal difference in the joint shaft angle calculated by the joint shaft angle calculator 103. In step S203, the acceleration calculator 411 calculates the joint angular acceleration by determining the temporal difference in the joint angular velocity calculated by the velocity calculator 410. In step S204, the inertia moment calculator 412 reads the link parameters from the link parameter storage unit 201. Using the joint shaft angle calculated by the joint shaft angle calculator 103 and the read link parameters, the inertia moment calculator 412 calculates the link inertia moment at each joint. In step S205, based on the joint angular acceleration calculated by the acceleration calculator 411 and the inertia moment calculated by the inertia moment calculator 412, the inertia torque calculator 413 calculates the inertia torque.

c) In step S206, the gravity torque calculator 403 reads the link parameters from the link parameter storage unit 201. Based on the joint shaft angle calculated by the joint shaft angle calculator 103 and the read link parameters, the gravity torque calculator 403 calculates the gravity force acting on each of the links 301 and 302, and then calculates the gravity torque to compensate for the calculated gravity force.

d) In step S207, the adding unit 404 calculates the sum of the friction torque calculated by the friction torque calculator 401, the inertia torque calculated by the inertia torque calculator 413, and the gravity torque calculated by the gravity torque calculator 403, and outputs the sum as the estimated drive torque. In step S208, the drive torque estimating operation comes to an end.

As described above, according to the present embodiment, the external force acting on each of the links can be estimated, and a flexible operation is performed with a compliance model that is set based on the estimated external model. Accordingly, simple direct teaching to the robot can be realized.

(Modification)

Figure 7:
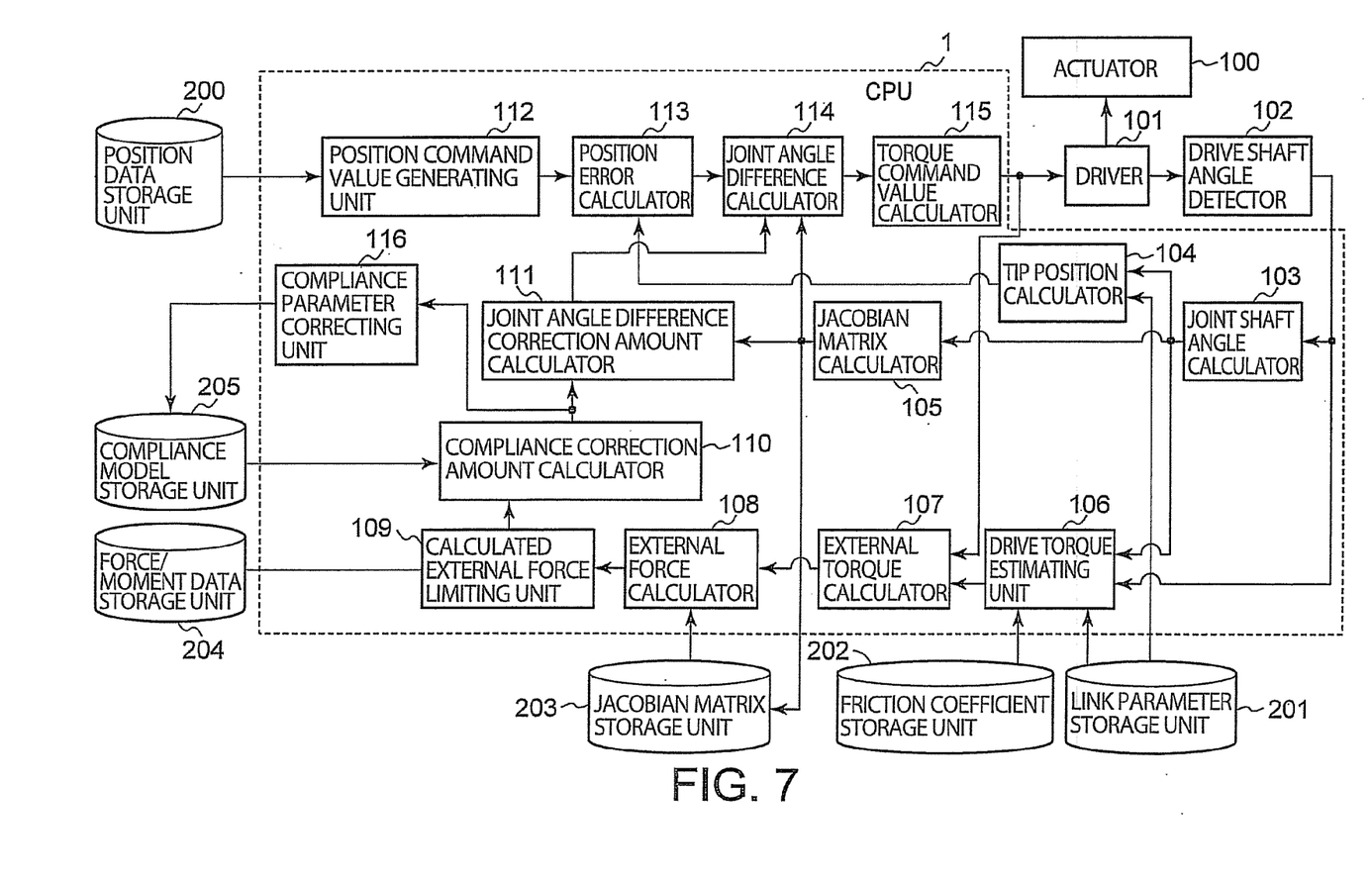
FIG. 7 is a block diagram of a robot control apparatus according to a modification of the embodiment.

FIG. 7 shows a robot control apparatus according to a modification of this embodiment. The robot control apparatus of this modification is a control apparatus that is capable of changing the compliance model parameter. The robot control apparatus of this modification is the same as the robot control apparatus of this embodiment shown in FIG. 1, except that a compliance parameter correcting unit 116 is further added.

A compliance model for an external force applied by an operator for direct teaching differs from a compliance model to be used at the time of a collision, and the difference is normally accommodated by changing the compliance model parameter. In a case where an additional sensor is not used, however, it is difficult to clearly distinguish an intentionally-applied external force from an external force applied by a collision. Further, a stable operation cannot be performed at the time of parameter switching, unless each parameter set is changed in a continuous manner.

Therefore, as in the modification illustrated in FIG. 7, the compliance parameter correcting unit 116 is provided to enable a stable operation even at the time of a collision. The compliance parameter correcting unit 116 changes the compliance model parameter, based on the history of compliance correction amounts calculated by the compliance correction amount calculator 110. The compliance parameter correcting unit 116 then writes the change into the compliance model storage unit 205. When an operation is started, the compliance model parameter is for a collision. As the correction amount is generated by direct teaching, only the component of the generated external force in the parameter is changed. Accordingly, a higher degree of flexibility is achieved, and the manipulability can be increased.

Also, the compliance model parameter may be corrected periodically. Each cycle of correcting the parameter may be several times longer than each control cycle. Accordingly, the robot is prevented from vibration due to a parameter correction.

Figure 8:
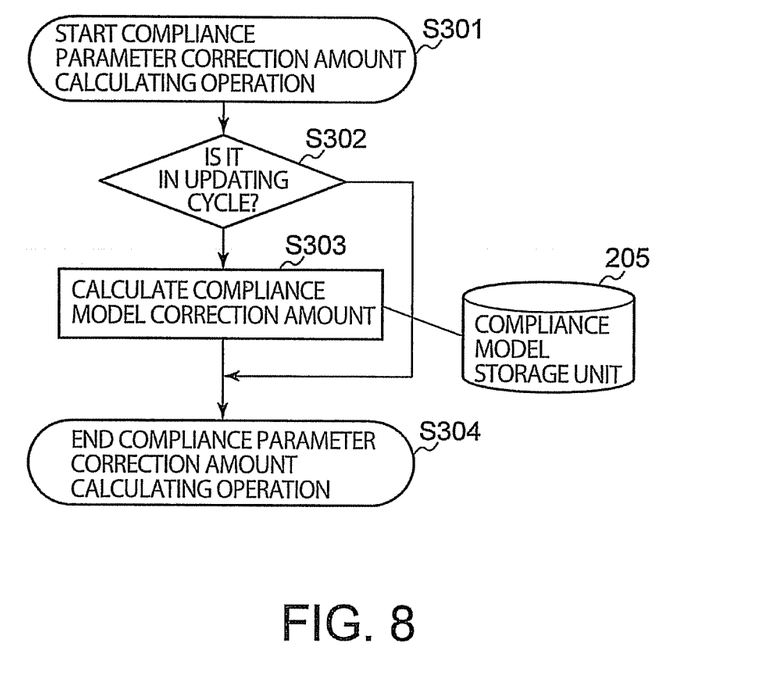
FIG. 8 is a flowchart showing a compliance parameter correction amount calculating operation according to the modification of the embodiment.

Referring now to the flowchart shown in FIG. 8, operations of the compliance parameter correcting unit 116 of this modification are described.

In step S301, a compliance parameter correcting operation is started. In step S302, a check is made to determine whether the compliance model parameter is to be corrected in this control cycle (a cycle of correcting a parameter). If the compliance model parameter is not to be corrected, the operation moves on to step S304, and comes to an end. If the compliance model parameter is to be corrected, the operation moves on to step S303. The compliance parameter correcting unit 116 corrects the compliance model parameter, and writes the correction result into the compliance model storage unit 205. In step S304, the operation comes to an end.

Although an embodiment has been described above, the description and drawings constituting part of the disclosure do not limit the invention. From this disclosure, it will become apparent to those skilled in the art that various other embodiments, examples, and operations are possible.

Figure 9:
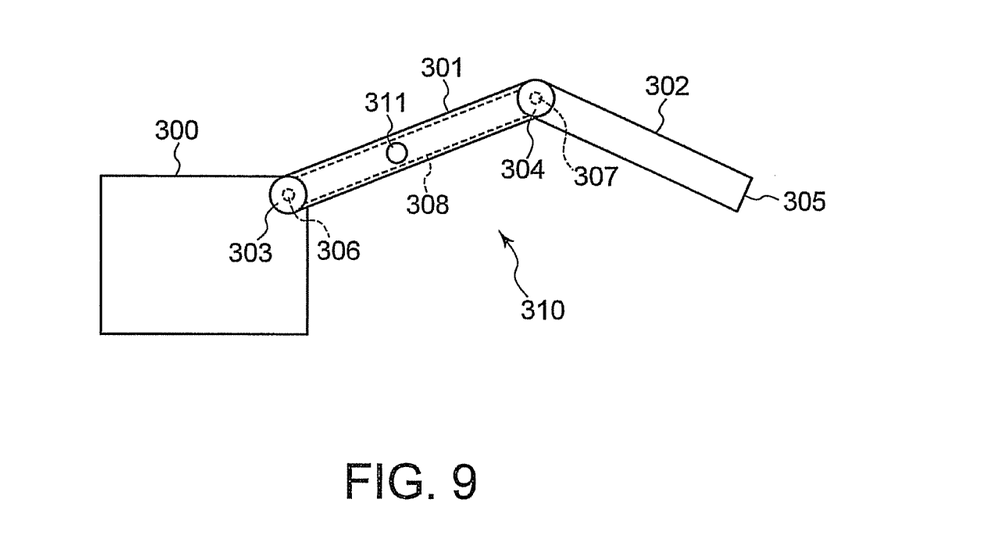
FIG. 9 is a schematic view of another example of an object to be controlled.

For example, when an inertia torque is calculated in the above described embodiment, the joint angular acceleration calculated by the velocity calculator 410 and the acceleration calculator 411 using a two-time difference in the joint shaft angle with respect to time is used. However, the time lag becomes longer depending on the control cycles, and the torque error is likely to become larger. In that case, an acceleration of the link 301 may be detected by an acceleration sensor 311 mounted on the link 301 as shown in FIG. 9, and the detected acceleration may be converted into a joint angular acceleration by the acceleration calculator 411. Based on the joint angular acceleration, the inertia torque may be calculated.

Also, in the drive torque estimating operation described above, a drive torque is estimated by using a friction torque, an inertia torque, and a gravity torque. However, the present invention is not limited to that. For example, parameters such as centrifugal force or Coriolis force may be further taken into account.

The CPU 1, the location data storage unit 200, the link parameter storage unit 201, the friction coefficient storage unit 202, the Jacobian matrix storage unit 203, the force/moment data storage unit 204, the compliance model storage unit 205, and the like may be incorporated into the robot to be controlled. Alternatively, the CPU 1, the location data storage unit 200, the link parameter storage unit 201, the friction coefficient storage unit 202, the Jacobian matrix storage unit 203, the force/moment data storage unit 204, the compliance model storage unit 205, and the like may be placed outside the robot to be controlled, and the robot may be remotely controlled in a wired or wireless manner.

While certain embodiments have been described, these embodiments have been presented by way of example only, and are not intended to limit the scope of the inventions. Indeed, the novel methods and systems described herein can be embodied in a variety of other forms; furthermore, various omissions, substitutions and changes in the form of the methods and systems described herein can be made without departing from the spirit of the inventions. The accompanying claims and their equivalents are intended to cover such forms or modifications as would fall within the scope and spirit of the inventions.

The invention claimed is:

1. A robot control apparatus that controls a robot comprising a joint shaft and a drive shaft transmitting a drive force to the joint shaft, comprising:

an actuator driving the joint shaft in each control cycle;

a drive shaft angle detector detecting an angle of the drive shaft;

a joint shaft angle calculator calculating an angle of the joint shaft from the angle of the drive shaft;

a tip position calculator calculating a position of a tip of the robot from the angle of the joint shaft;

a position error calculator calculating a position error between the position of the tip of the robot and a position command value for the position of the tip of the robot;

a Jacobian matrix calculator calculating, based on the angle of the joint shaft, a partial Jacobian matrix of a portion between a task coordinate system and a joint coordinate system at the joint shaft, and calculating a Jacobian matrix of a portion between a task coordinate system and a joint coordinate system at the position of the tip of the robot by integrating the partial Jacobian matrix;

a joint angle difference calculator calculating a joint angle difference;

a torque command value calculator calculating a torque command value for a joint, based on the joint angle difference;

a driver driving the actuator, based on the torque command value;

a drive torque estimating unit estimating a drive torque for driving the actuator from the angle of the joint shaft;

an external torque calculator calculating an external torque that is a difference between the estimated drive torque and the torque command value, and determining an external force receiving joint shaft on which an external force from the external torque acts;

an external force calculator calculating, from the external torque and the partial Jacobian matrix, the external force acting on the external force receiving joint shaft;

a compliance model storage unit storing a compliance model at the external force receiving joint shaft;

a compliance correction amount calculator calculating a compliance correction amount for a task coordinate system position at the external force receiving joint shaft in accordance with the external force, using the compliance model; and a joint angle difference correction amount calculator calculating a joint angle difference correction amount from the compliance correction amount and the partial Jacobian matrix, wherein the joint angle difference calculator calculates an uncorrected joint angle difference through an inverse kinematic calculation using the position error and the Jacobian matrix, and outputs the sum of the uncorrected joint angle difference and the joint angle difference correction amount as the joint angle difference.

2. The apparatus according to claim 1, further comprising:

a correction amount storage unit storing the compliance correction amount; and a compliance parameter correcting unit correcting a compliance parameter, based on a plurality of correction amounts stored in the correction amount storage unit.

3. The apparatus according to claim 2, wherein the compliance parameter correcting unit is operated in longer cycles than the control cycles.

4. The apparatus according to claim 1, further comprising a calculated external force limiting unit comparing the external force calculated by the external force calculator with an allowable value, reducing the external force to the allowable value when the external force exceeds the allowable value, and setting the external force to zero when the external force is smaller than a minimum value.

* * * * *